(12) United States Patent
Bai et al.

(10) Patent No.: US 8,578,188 B1
(45) Date of Patent: *Nov. 5, 2013

(54) METHOD AND SYSTEM FOR SELECTING AN OPERATING FREQUENCY FOR A CHIP TO PROVIDE A DESIRED OVERALL POWER DISSIPATION VALUE FOR THE CHIP

(71) Applicant: Marvell International Ltd., Hamilton (BM)

(72) Inventors: Yu Bai, Worcester, MA (US); Priya Vaidya, Shrewsbury, MA (US); Premanand Sakarda, Acton, MA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/633,679

(22) Filed: Oct. 2, 2012

Related U.S. Application Data

(63) Continuation of application No. 12/400,604, filed on Mar. 9, 2009, now Pat. No. 8,281,160.

(60) Provisional application No. 61/045,714, filed on Apr. 17, 2008.

(51) Int. Cl.
*G06F 1/00* (2006.01)

(52) U.S. Cl.
USPC ............................................... 713/300

(58) Field of Classification Search
USPC ............................................... 713/300
See application file for complete search history.

(56) References Cited

U.S. PATENT DOCUMENTS

| | | | |
|---|---|---|---|
| 6,762,629 B2 * | 7/2004 | Tam et al. | 327/114 |
| 6,788,156 B2 * | 9/2004 | Tam et al. | 331/49 |
| 6,996,441 B1 | 2/2006 | Tobias | |
| 7,502,948 B2 * | 3/2009 | Rotem et al. | 713/300 |
| 7,730,340 B2 | 6/2010 | Hu et al. | |
| 7,752,479 B2 | 7/2010 | Huang et al. | |
| 8,051,310 B2 * | 11/2011 | He et al. | 713/320 |
| 2005/0076253 A1 * | 4/2005 | Lu | 713/320 |
| 2007/0150893 A1 | 6/2007 | Grobman | |

* cited by examiner

*Primary Examiner* — Mohammed Rehman

(57) ABSTRACT

Methods, apparatus, and computer program products for implementing power management within Systems on Chips (SOCs). The method includes selecting an operating frequency for a chip from an operating frequency point set that provides a desired overall power dissipation value.

20 Claims, 2 Drawing Sheets

METHOD AND SYSTEM FOR SELECTING AN OPERATING FREQUENCY FOR A CHIP TO PROVIDE A DESIRED OVERALL POWER DISSIPATION VALUE FOR THE CHIP

CROSS REFERENCE TO RELATED APPLICATIONS

The present disclosure claims priority to U.S. patent application Ser. No. 12/400,604, filed Mar. 9, 2009, entitled "Method and System for Selecting an Operating Frequency for a Chip to Provide a Desired Overall Power Dissipation Value for the Chip," now U.S. Pat. No. 8,281,160, issued Oct. 2, 2012, which claims priority to U.S. Patent Application No. 61/045,714, filed Apr. 17, 2008, entitled "An Adaptive Closed-Loop Chip Power Predictor in a Power Management Framework."

The present disclosure is related to U.S. patent application Ser. No. 12/942,599, filed Nov. 9, 2010, which is a continuation-in-part of and claims priority to U.S. patent application Ser. No. 12/400,604, filed Mar. 9, 2009.

The disclosures of the foregoing applications referenced in this section are incorporated herein by reference.

TECHNICAL FIELD

Embodiments of the present disclosure relate to the field of power management, and more particularly, to power management within Systems on Chips (SOCs).

BACKGROUND

In general, for various micro-architecture platforms for SOCs, an adaptive power management technique may be utilized that dynamically characterizes workloads based on system-level events and adapts frequency and voltage in order to save power dissipation. An overall framework for embedded software-based power management may include two basic components, specifically, a performance/idle profiler and a policy manager. The profiler is responsible for probing the system, collecting statistics from a performance monitoring unit and operating system, and making the statistics available to the policy manager. The policy manager may then use these inputs and statistics in order to optimally choose a suitable system operating point (including core, bus, memory frequency, processor states and voltages) and even different power modes to save power while satisfying an application's dynamic performance needs.

Accordingly, it may be desirable to refine existing software based frameworks to reconfigure available system resources, mainly SOCs, and therefore reduce power dissipation on the fly while still guaranteeing reasonable levels of performance in an embedded system, such as, for example, cellular phones or personal digital assistants (PDAs) and other consumer electronic devices.

SUMMARY

The present disclosure provides a method comprising providing pre-defined active chip power dissipation values related to operating frequency points of a chip, providing pre-defined idle chip power dissipation values related to the operating frequency points of the chip, analyzing memory statistics at two or more of the operating frequency points based upon a computational and memory composition of a workload of a central processing unit (CPU) configured within the chip including at least one prior CPU utilization percentage, and predicting future CPU utilization percentages at the two or more operating frequency points based upon the analyzed memory statistics. The method also comprises determining an operating frequency point set that provides overall power dissipation values at the two or more operating frequency points, the overall power dissipation values being related to the active chip power dissipation values at the two or more chip operating frequency points, the idle chip dissipation power values at the two or more chip operating frequency points, and the future CPU utilization percentages, wherein each operating frequency in the operating frequency point set is able to provide substantially adequate bandwidth for a current CPU workload, and selecting an operating frequency for the chip from the operating frequency point set that provides a desired overall power dissipation value.

In accordance with various embodiments, the operating frequency point set is defined as:

$$\begin{cases} F_1: & P_1 = AP_1 \times CPU\%[1]_n + IP_1 \times (1 - CPU\%[1]_n) \\ F_2: & P_2 = AP_2 \times CPU\%[2]_n + IP_2 \times (1 - CPU\%[2]_n) \\ \ldots \\ F_N: & P_N = AP_N \times CPU\%[N]_n + IP_N \times (1 - CPU\%[N]_n) \end{cases}$$

wherein F represents an operating frequency, P represents overall power dissipation at a frequency F, AP represents an active mode power dissipation value of the chip, CPU % represents a percentage that the CPU is in an active mode and IP represents an idle mode power dissipation value of the chip.

In accordance with various embodiments, the method further comprises sampling actual power dissipation values during a sampling window, determining an average power dissipation value based on the sampled actual power dissipation values, determining if an absolute value of a difference between a predicted power dissipation value and the average power dissipation value exceeds a first predetermined threshold, and adjusting an active power component of the predicted power dissipation value, if the absolute value exceeds the first predetermined threshold.

In accordance with various embodiments, the actual power dissipation values are sampled during the sampling window only if the operating frequency for the chip multiplied by the percentage that the CPU is predicted to be in an active mode is less than a second predetermined threshold.

The present disclosure also provides a chip comprising a power management framework comprising a policy manager, the policy manager configured to analyze memory statistics at two or more chip operating frequency points based upon a computational and memory composition of a workload of a central processing unit (CPU) configured within the chip including at least one prior CPU utilization percentage, and predict future CPU utilization percentages at the two or more chip operating frequency points based upon the analyzed memory statistics. The policy manager is also configured to determine an operating frequency point set that provides overall power dissipation values at the two or more operating frequency points, the overall power dissipation values being related to predetermined active chip power dissipation values at the two or more chip operating frequency points, predetermined idle chip dissipation power values at the two or more chip operating frequency points, and the future CPU utilization percentages, wherein each operating frequency in the operating frequency point set is able to provide substantially adequate bandwidth for a current CPU workload, and select an operating frequency for the chip from the operating frequency point set that provides a desired overall power dissipation value.

In accordance with various embodiments, the operating frequency point set is defined as:

$$\begin{cases} F_1: & P_1 = AP_1 \times CPU\%[1]_n + IP_1 \times (1 - CPU\%[1]_n) \\ F_2: & P_2 = AP_2 \times CPU\%[2]_n + IP_2 \times (1 - CPU\%[2]_n) \\ \ldots \\ F_N: & P_N = AP_N \times CPU\%[N]_n + IP_N \times (1 - CPU\%[N]_n) \end{cases}$$

wherein F represents an operating frequency, P represents overall power dissipation at a frequency F, AP represents an active mode power dissipation value of the chip, CPU % represents a percentage that the CPU is in an active mode and IP represents an idle mode power dissipation value of the chip.

In accordance with various embodiments, the power meter is further configured to sample actual power dissipation values during a sampling window, determine an average power dissipation value based on the sampled actual power dissipation values, determine if an absolute value of a difference between a predicted power dissipation value and the average power dissipation value exceeds a first predetermined threshold, and adjust an active power component of the predicted power dissipation value, if the absolute value exceeds the first predetermined threshold.

In accordance with various embodiments, the power meter is configured to sample the actual power dissipation values during the sampling window only if the operating frequency for the chip multiplied by the percentage that the CPU is predicted to be in an active mode is less than a second predetermined threshold.

The present disclosure also provides a computer readable medium having instructions stored thereon that, if executed, result in analyzing memory statistics at two or more chip operating frequency points based upon a computational and memory composition of a workload of a central processing unit (CPU) configured within a chip including at least one prior CPU utilization percentage, predicting future CPU utilization percentages at the two or more chip operating frequency points based upon the analyzed memory statistics, determining an operating frequency point set that provides overall power dissipation values at the two or more operating frequency points, the overall power dissipation values being related to predetermined active chip power dissipation values at the two or more chip operating frequency points, predetermined idle chip dissipation power values at the two or more chip operating frequency points, and the future CPU utilization percentages, wherein each operating frequency in the operating frequency point set is able to provide substantially adequate bandwidth for a current CPU workload, and selecting an operating frequency for the chip from the operating frequency point set that provides a desired overall power dissipation value.

In accordance with various embodiments, the operating frequency point set is defined as:

$$\begin{cases} F_1: & P_1 = AP_1 \times CPU\%[1]_n + IP_1 \times (1 - CPU\%[1]_n) \\ F_2: & P_2 = AP_2 \times CPU\%[2]_n + IP_2 \times (1 - CPU\%[2]_n) \\ \ldots \\ F_N: & P_N = AP_N \times CPU\%[N]_n + IP_N \times (1 - CPU\%[N]_n) \end{cases}$$

wherein F represents an operating frequency, P represents overall power dissipation at a frequency F, AP represents an active mode power dissipation value of the chip, CPU % represents a percentage that the CPU is in an active mode and IP represents an idle mode power dissipation value of the chip.

In accordance with various embodiments, the computer readable medium further comprises instructions stored thereon that, if executed, result in sampling actual power dissipation values during a sampling window, determining an average power dissipation value based on the sampled actual power dissipation values, determining if an absolute value of a difference between a predicted power dissipation value and the average power dissipation value exceeds a first predetermined threshold, and adjusting an active power component of the predicted power dissipation value, if the absolute value exceeds the first predetermined threshold.

In accordance with various embodiments, the actual power dissipation values are sampled during the sampling window only if the operating frequency for the chip multiplied by the percentage that the CPU is predicted to be in an active mode is less than a second predetermined threshold.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Embodiments of the disclosure are illustrated by way of example and not by way of limitation in the figures of the accompanying drawings.

DETAILED DESCRIPTION OF EMBODIMENTS OF THE DISCLOSURE

In the following detailed description, reference is made to the accompanying drawings which form a part hereof wherein like numerals designate like parts throughout, and in which is shown by way of illustration embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

Various operations may be described as multiple discrete operations in turn, in a manner that may be helpful in understanding embodiments of the present disclosure; however, the order of description should not be construed to imply that these operations are order dependent.

For the purposes of the present disclosure, the phrase "A/B" means A or B. For the purposes of the present disclosure, the phrase "A and/or B" means "(A), (B), or (A and B)." For the purposes of the present disclosure, the phrase "at least one of A, B, and C" means "(A), (B), (C), (A and B), (A and C), (B and C), or (A, B and C)." For the purposes of the present disclosure, the phrase "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Embodiments of the present disclosure provide an adaptive closed-loop power predictor using power profiling methodology and a power measurement device embedded within a chip.

Figure 1:
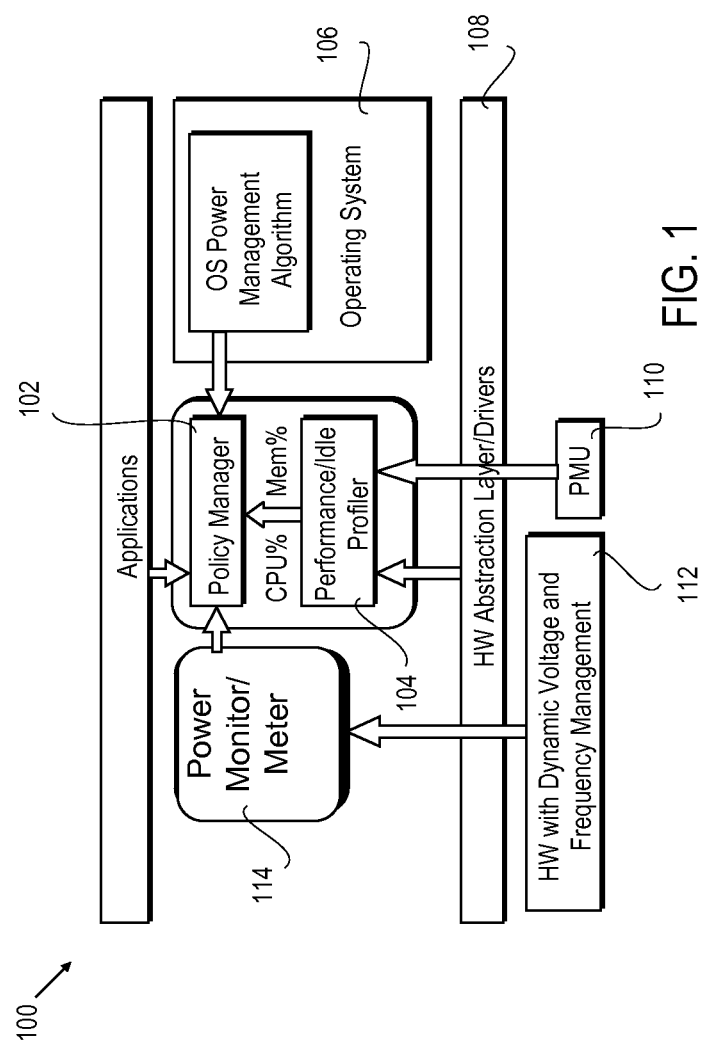
FIG. 1 schematically illustrates a block diagram of a framework for a micro-architecture-based platform, in accordance with various embodiments of the present disclosure.

FIG. 1 schematically illustrates a block diagram of a framework 100 for a micro-architecture-based platform for use with systems on chips (SOCs). The framework 100 includes a policy manager 102 and a performance/idle profiler 104. An operating system 106 is included having an operating system power management algorithm embedded therein. A hardware abstraction layer/driver 108 and a performance monitoring unit (PMU) 110 are also included. Hardware 112 that includes dynamic voltage and frequency management is also illustrated. In accordance with various embodiments of the present disclosure, a chip power information level monitor 114 is also included. In various embodiments, a power meter may also be included in the chip power information level monitor 114.

In accordance with various embodiments, the performance/idle profiler 104 collects two types of system statistics within the framework 100 of FIG. 1. The first type of statistics may be the central processing unit (CPU) utilization calculated based on operating system idle threads, which is generally the most direct indicator of CPU occupancy. The second type of statistics that the performance/idle profiler 104 may collect is memory utilization, which may be calculated based upon system performance by probing with the PMU 110. Periodically, the framework's performance/idle profiler 104 may collect CPU utilization and memory statistics and deliver them to the policy manager 102 for use in its decision-making with regard to operation of the system. Such a period is typically referred to as "a sampling window."

At the end of each sampling window, both CPU and memory statistics in the current window may be delivered to the policy manager 102. The policy manager 102, in turn, may choose a desired power mode in terms of lowest power dissipation from all power modes with enough bandwidth and then reschedule the system resources as needed for the next sampling window. In accordance with various embodiments of the present disclosure, the power management framework 100 includes providing the policy manager 102 with, in addition to the CPU utilization and memory statistics, a power profiling for both an active power mode and an idle power mode.

In accordance with various embodiments, it is assumed that the system provides N chip operating frequency points: $\{F_1, F_2, \ldots, F_N\}$; for example, $\{52\text{ MHz}, 104\text{ MHz}, 208\text{ MHz}, 312\text{ MHz}, 416\text{ MHz}, 624\text{ MHz}\}$.

For each frequency point, the active chip power may be statically pre-defined as:

$$AP_i \text{ where } i=1\ldots N \quad \text{Eq. 1}$$

Similarly, the idle chip power may be defined as:

$$IP_i \text{ where } i=1\ldots N \quad \text{Eq. 2}$$

If in the $(n-1)^{th}$ sampling window, the system runs at the $j^{th}$ frequency point, i.e., $F_j$, it may be observed that CPU utilization is CPU $\%_{(n-1)}$. Then, in this sampling window, the power dissipated in the chip may be denoted as:

$$\text{Power}_{(n-1)} = AP_j \times \text{CPU}\%_{(n-1)} + IP_j \times (1-\text{CPU}\%)_{(n-1)} \quad \text{Eq. 3}$$

For the $n^{th}$ sampling window, there are potentially N choices provided that every frequency point has enough bandwidth for the current system workload. The corresponding power dissipation in each frequency may be estimated as follows:

$$\begin{cases} F_1: & P_1 = AP_1 \times CPU\%[1]_n + IP_1 \times (1-CPU\%[1]_n) \\ F_2: & P_2 = AP_2 \times CPU\%[2]_n + IP_2 \times (1-CPU\%[2]_n) \\ \ldots \\ F_N: & P_N = AP_N \times CPU\%[N]_n + IP_N \times (1-CPU\%[N]_n) \end{cases} \quad \text{Eq. 4}$$

In accordance with various embodiments, the policy manager 102 first analyzes memory statistics and predicts CPU utilizations, represented by CPU $\%[1]_n$, CPU $\%[2]_n$, and CPU $\%[N]_n$ in Eq. 4, at different frequency points based upon the system's workloads' computational and memory composition. The policy manager 102 may then select an operating point set based upon Eq. 4 that is able to provide enough bandwidth with reasonable margins for the current workload. Finally, the policy manager 102 may choose a frequency having a minimal power estimation from the selected operating point set to be the operating frequency for the next sampling window.

As known in the art, chip power defined in Eqs. 1 and 2 is generally silicon dependent and reflects the way hardware is designed and how software runs over the hardware. Initially, active and idle chip power may be statically measured by a power meter that may be included within the chip power information level monitor 114 embedded in the chip. In the idle modes, clocks to the CPU core generally are gated off while the rest of the chip may run in an active mode. In active modes, all power domains in the chip generally are clock enabled and running. Though the idle power measurement is typically quite straightforward and thus accurate, the active power measurement may be tricky. Such measurement is generally not a constant even at a fixed frequency. Instead, the active power measurement heavily depends upon instruction sets that are actually executed on the CPU. In general, the active power difference by running Dhrystone and multimedia applications may reach as much as 20 percent. Accordingly, it may be desirable to dynamically calibrate the active power of the CPU so as to make the power prediction in Eq. 4 more precise. However, continuous calibration is generally expensive and it potentially degrades the system performance. Thus, in accordance with various embodiments of the present disclosure, dynamic calibrations may only be performed when the system is not busy.

In accordance with various embodiments, dynamic calibrations only measure the chip power a limited number of times during one window period. For example, a dynamic calibration may only be performed when the number of million instructions per second (MIPS) is less than 20. In such a situation, the power meter of chip power information level monitor 114 may be enabled and the chip power may be measured a number of times, e.g., 10 times. The 10 measured samples may then be averaged as the power consumption in the current sample window. In accordance with various embodiments, when the power prediction provided by Eq. 3 is higher or lower than the average measurement in the sample window by more than 10 percent, the active power value for that window's frequency may be adjusted accordingly, i.e., higher or lower.

Figure 2:
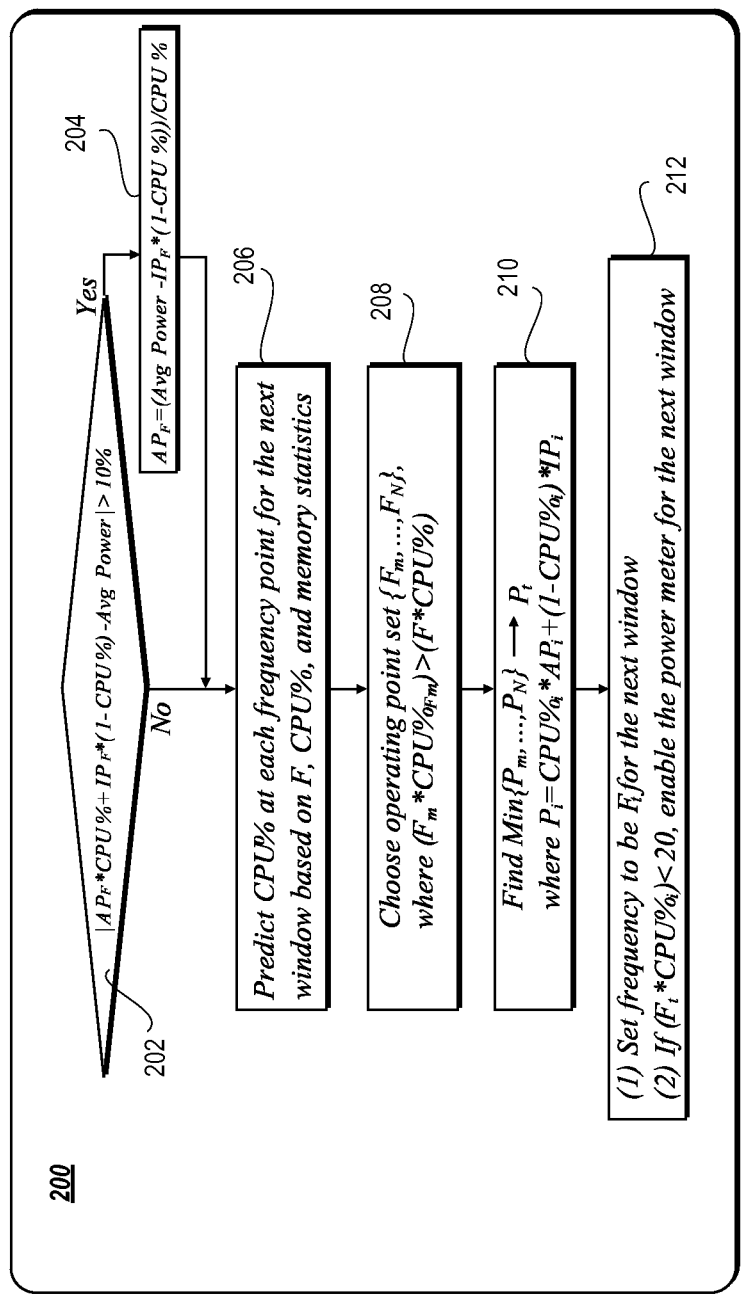
FIG. 2 is a flowchart illustrating a power management method that may be carried out by the framework illustrated in FIG. 1, in accordance with various embodiments of the present disclosure.

Thus, with reference to FIG. 2, a method 200 may begin at 202 with a calibration where the policy manager 102 may determine if the absolute value of the difference between the predicted power dissipation and the average power dissipation in a current sample window is greater than 10 percent. If it is determined that the absolute value is greater than 10 percent, in accordance with various embodiments the active power may be adjusted accordingly at 204. If the absolute value is not greater than 10 percent, or once the active power has been adjusted accordingly, the policy manager 102 may then predict the CPU active percentage at each frequency point for the next sample window based upon various factors, including, for example, operating frequency, CPU percentage usage and various memory statistics at 206.

An operating frequency point set may then be chosen at 208, with each operating frequency in the operating frequency point set being able to provide enough bandwidth with reasonable margins for the current workload for the next sample window. The operating frequency point set may be selected from a look-up table based upon pre-determined power values. An operating frequency may then be selected at 210 from the operating frequency point set for operation that provides minimal power dissipation estimation for the next sampling window. The policy manager 102 may then set the operating frequency to be the selected frequency for the next sampling window at 212. If the frequency multiplied by the predicted CPU percentage usage is less than a threshold, e.g., 20 MIPS for the next sampling window, then the power meter of chip power information level monitor 114 may be enabled for the next sampling window in order to allow for another calibration. Thus, the power is adjusted based on the operating point selected as measured active power varies with the selected operating point. The idle power is fixed and does not vary with the workload as CPU is not executing code in idle. The idle power could either be measured from the power meter or from the look up table.

In accordance with various embodiments, an article of manufacture may be provided that includes a storage medium having instructions stored thereon that, if executed, result in the actions described herein with respect to FIGS. 1 and 2. In an embodiment, the storage medium comprises some type of memory (not shown). In accordance with various embodiments, the article of manufacture may be a computer-readable medium such as software or firmware.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments illustrated and described without departing from the scope of the present disclosure. Those with skill in the art will readily appreciate that embodiments in accordance with the present disclosure may be implemented in a very wide variety of ways. This application is intended to cover any adaptations or variations of the embodiments discussed herein. Therefore, it is manifestly intended that embodiments in accordance with the present disclosure be limited only by the claims and the equivalents thereof.

What is claimed is:

1. A method comprising:
   providing first values corresponding to dissipation of power of a chip when the chip is active, wherein the first values comprise a first plurality of values of dissipation of power of the chip when the chip is active, and wherein each of the first plurality of values of dissipation of power of the chip corresponds to a respective operating frequency point of a first plurality of operating frequency points of the chip;
   providing second values corresponding to dissipation of power of the chip when the chip is idle, wherein the second values comprise a second plurality of values of dissipation of power of the chip when the chip is active, and wherein each of the second plurality of values of dissipation of power of the chip corresponds to a respective operating frequency point of a second plurality of operating frequency points of the chip;
   based upon a composition of a workload of a central processing unit (CPU) configured within the chip, analyzing memory statistics at two or more operating frequency points, wherein the two or more of the operating frequency points are included in (i) the first plurality of operating frequency points of the chip and (ii) the second plurality of operating frequency points of the chip;
   based upon the memory statistics that have been analyzed, predicting percentage of utilization of the CPU during a future operation of the CPU at each of the two or more operating frequency points;
   determining an operating frequency point set that provides third values corresponding to overall power dissipation of the chip at the two or more operating frequency points, wherein the third values are related to (i) the first values at the two or more operating frequency points, (ii) the second values at the two or more chip operating frequency points, and (iii) the predicted percentage of utilization of the CPU during the future operation of the CPU at each of the two or more operating frequency points, wherein each operating frequency in the operating frequency point set is able to provide substantially adequate bandwidth for a current workload of the CPU; and
   selecting an operating frequency for the chip from the operating frequency point set, wherein the operating frequency that is selected provides a desired value corresponding to overall power dissipation of the chip while still providing the substantially adequate bandwidth for the current workload of the CPU.

2. The method of claim 1, wherein:
the operating frequency point set is defined as $$\begin{cases} F_1: & P_1 = AP_1 \times CPU\%[1]_n + IP_1 \times (1 - CPU\%[1]_n) \\ F_2: & P_2 = AP_2 \times CPU\%[2]_n + IP_2 \times (1 - CPU\%[2]_n) \\ \dots \\ F_N: & P_N = AP_N \times CPU\%[N]_n + IP_N \times (1 - CPU\%[N]_n); \text{ and} \end{cases}$$

wherein F represents an operating frequency of the chip, P represents overall power dissipation of the chip at a frequency F, AP represents a value of the first plurality of values corresponding to an active mode power dissipation of the chip, CPU % represents a percentage that the CPU is in the active mode, and IP represents a value of the second plurality of values corresponding to an idle mode power dissipation value of the chip.

3. The method of claim 1, wherein:
the first values are provided from a look-up table; and
the second values are provided from the look-up table.

4. The method of claim 1, further comprising:
sampling actual values corresponding to power dissipation of the chip during a sampling window;
based on the actual values corresponding to power dissipation of the chip that are sampled during the sampling window, determining an average value corresponding to power dissipation of the chip;
determining if an absolute value of a difference exceeds a first predetermined threshold, wherein the difference is determined between (i) a predicted value corresponding to power dissipation of the chip and (ii) the value average value corresponding to power dissipation of the chip; and if the absolute value exceeds the first predetermined threshold, adjusting an active power component of the predicted value corresponding to power dissipation of the chip.

5. The method of claim 4, wherein the first predetermined threshold is 10%.

6. The method of claim 4, wherein the actual values corresponding to power dissipation of the chip are sampled during the sampling window only if the operating frequency for the chip multiplied by a percentage that the CPU is predicted to be in an active mode is less than a second predetermined threshold.

7. The method of claim 1, wherein the memory statistics include at least a percentage of utilization of the CPU during a prior operation of the CPU to perform the composition of the workload.

8. A chip comprising:
a power management framework comprising a policy manager, the policy manager configured to
based upon a composition of a workload of a central processing unit (CPU) configured within the chip, analyze memory statistics at two or more of the operating frequency points,
based upon the memory statistics that have been analyzed, predict a percentage of utilization of the CPU during a future operation of the CPU at each of the two or more operating frequency points,
determine an operating frequency point set that provides first values corresponding to overall power dissipation of the chip at the two or more operating frequency points, wherein the first values are related to
(i) second values at the two or more chip operating frequency points, wherein the second values correspond to dissipation of power of the chip when the chip is active,
(ii) third values at the two or more chip operating frequency points, wherein the third values correspond to dissipation of power of the chip when the chip is idle, and
(iii) the predicted percentage of utilization of the CPU during the future operation of the CPU, wherein each operating frequency in the operating frequency point set is able to provide substantially adequate bandwidth for a current workload of the CPU, and
select an operating frequency for the chip from the operating frequency point set, wherein the operating frequency that is selected provides a desired value corresponding to overall power dissipation of the chip while still providing the substantially adequate bandwidth for the current workload of the CPU.

9. The chip of claim 8, wherein the operating frequency point set is defined as $$\begin{cases} F_1: & P_1 = AP_1 \times CPU\%[1]_n + IP_1 \times (1 - CPU\%[1]_n) \\ F_2: & P_2 = AP_2 \times CPU\%[2]_n + IP_2 \times (1 - CPU\%[2]_n) \\ \ldots \\ F_N: & P_N = AP_N \times CPU\%[N]_n + IP_N \times (1 - CPU\%[N]_n), \end{cases}$$

and wherein F represents an operating frequency of the chip, P represents overall power dissipation of the chip at a frequency F, AP represents an value corresponding to an active mode power dissipation of the chip, CPU % represents a percentage that the CPU is in an active mode, and IP represents an idle mode power dissipation value of the chip.

10. The chip of claim 8, wherein:
the second values are stored in a look-up table; and
the third values are stored in the look-up table.

11. The chip of claim 8, wherein the power management framework further comprises a power meter configured to:
sample actual values corresponding to power dissipation of the chip during a sampling window; and
based on the actual values corresponding to power dissipation of the chip that are sampled during the sampling window, determine an average value corresponding to power dissipation of the chip;
wherein the policy manager is further configured to
determine if an absolute value of a difference exceeds a first predetermined threshold, wherein the difference is determined between (i) a predicted value corresponding to power dissipation of the chip and (ii) the value average value corresponding to power dissipation of the chip, and
if the absolute value exceeds the first predetermined threshold, adjust an active power component of the predicted value corresponding to power dissipation of the chip.

12. The chip of claim 11, wherein the first predetermined threshold is 10%.

13. The chip of claim 11, wherein the power meter is configured to sample the actual values corresponding to power dissipation of the chip are sampled during the sampling window only if the operating frequency for the chip multiplied by a percentage that the CPU is predicted to be in an active mode is less than a second predetermined threshold.

14. The chip of claim 13, wherein the second predetermined threshold is 20 million instructions per second.

15. A non-transitory computer readable medium having instructions tangibly stored thereon that, if executed, result in:
based upon a composition of a workload of a central processing unit (CPU) configured within a chip, analyze memory statistics at two or more operating frequency points;
based upon the memory statistics that have been analyzed, predict a percentage of utilization of the CPU during a future operation of the CPU at each of the two or more operating frequency points;
determine an operating frequency point set that provides first values corresponding to overall power dissipation of the chip at the two or more operating frequency points, wherein the first values are related to
(i) second values at the two or more chip operating frequency points, wherein the second values correspond to dissipation of power of the chip when the chip is active,
(ii) third values at the two or more chip operating frequency points, wherein the third values correspond to dissipation of power of the chip when the chip is idle, and
(iii) the predicted percentage of utilization of the CPU during a future operation of the CPU, wherein each operating frequency in the operating frequency point set is able to provide substantially adequate bandwidth for a current workload of the CPU; and
select an operating frequency for the chip from the operating frequency point set, wherein the operating frequency that is selected provides a desired value corresponding to overall power dissipation of the chip while still providing the substantially adequate bandwidth for the current workload of the CPU.

16. The non-transitory computer readable medium of claim 15, wherein the operating frequency point set is defined as $$\begin{cases} F_1: & P_1 = AP_1 \times CPU\%[1]_n + IP_1 \times (1 - CPU\%[1]_n) \\ F_2: & P_2 = AP_2 \times CPU\%[2]_n + IP_2 \times (1 - CPU\%[2]_n) \\ \ldots \\ F_N: & P_N = AP_N \times CPU\%[N]_n + IP_N \times (1 - CPU\%[N]_n), \text{ and} \end{cases}$$

wherein F represents an operating frequency of the chip, P represents overall power dissipation of the chip at a frequency F, AP represents an value corresponding to an active mode power dissipation of the chip, CPU % represents a percentage that the CPU is in an active mode, and IP represents an idle mode power dissipation value of the chip.

17. The non-transitory computer readable medium of claim 15, wherein:
the second values are stored in a look-up table; and
the third values are stored in the look-up table.

18. The non-transitory computer readable medium of claim 15, further comprising instructions tangibly stored thereon that, if executed, result in:
sampling actual values corresponding to power dissipation of the chip during a sampling window;
based on the actual values corresponding to power dissipation of the chip that are sampled during the sampling window, determining an average value corresponding to power dissipation of the chip;
determining if an absolute value of a difference exceeds a first predetermined threshold, wherein the difference is determined between (i) a predicted value corresponding to power dissipation of the chip and (ii) the value average value corresponding to power dissipation of the chip; and
if the absolute value exceeds the first predetermined threshold, adjusting an active power component of the predicted value corresponding to power dissipation of the chip.

19. The non-transitory computer readable medium of claim 18, wherein the actual values corresponding to power dissipation of the chip are sampled during the sampling window only if the operating frequency for the chip multiplied by a percentage that the CPU is predicted to be in an active mode is less than a second predetermined threshold.

20. The non-transitory computer readable medium of claim 19, wherein:
the first predetermined threshold is 10%; and
the second predetermined threshold is 20 million instructions per second.

\* \* \* \* \*